(12) United States Patent
Hennessy

(10) Patent No.: US 7,181,183 B1
(45) Date of Patent: Feb. 20, 2007

(54) TELECOMMUNICATION SYSTEM INCORPORATING A VANADIUM REDOX BATTERY ENERGY STORAGE SYSTEM

(75) Inventor: Timothy David John Hennessy, Portland, OR (US)

(73) Assignee: VRB Power Systems Inc., Vancouver (CA)

( * ) Notice: Subject to any disclaimer, the term of this patent is extended or adjusted under 35 U.S.C. 154(b) by 0 days.

(21) Appl. No.: 11/341,770

(22) Filed: Jan. 27, 2006

(51) Int. Cl.
H04B 1/18 (2006.01)

(52) U.S. Cl. .................. 455/289; 455/299; 455/343.5; 455/343.6; 455/343.2

(58) Field of Classification Search ................ 455/289, 455/299, 343.5, 343.6, 343.2
See application file for complete search history.

(56) References Cited

U.S. PATENT DOCUMENTS 4,786,567 A * 11/1988 Skyllas-Kazacos et al. ... 429/19
6,143,443 A * 11/2000 Kazacos et al. ............ 429/204
6,609,081 B1 * 8/2003 de Varennes et al. ....... 702/176
2004/0121204 A1 * 6/2004 Adelman et al. ............. 429/22

* cited by examiner

Primary Examiner—Matthew Anderson
Assistant Examiner—Minh Dao
(74) Attorney, Agent, or Firm—John R. Thompson; Stoel Rives LLP

(57) ABSTRACT

A telecommunication system incorporates a vanadium redox battery energy storage system. The vanadium redox battery energy storage system receives and is charged by DC power. Upon power interruption, telecommunication equipment relies on the vanadium redox battery energy storage system to receive DC power. A charger/rectifier monitors received AC power to determine if an AC power interruption is occurring and initiates DC power transmission from the vanadium redox battery energy storage system to the telecommunication equipment.

18 Claims, 4 Drawing Sheets

TELECOMMUNICATION SYSTEM INCORPORATING A VANADIUM REDOX BATTERY ENERGY STORAGE SYSTEM

TECHNICAL FIELD

This invention relates to vanadium redox battery energy storage systems and telecommunication equipment.

BRIEF DESCRIPTION OF THE DRAWINGS

A more particular description of the invention briefly described above will be rendered by reference to the appended drawings. Understanding that these drawings only provide information concerning typical embodiments of the invention and are not therefore to be considered limiting of its scope, the invention will be described and explained with additional specificity and detail through the use of the accompanying drawings, in which.

DETAILED DESCRIPTION OF PREFERRED EMBODIMENTS

Figure 1:
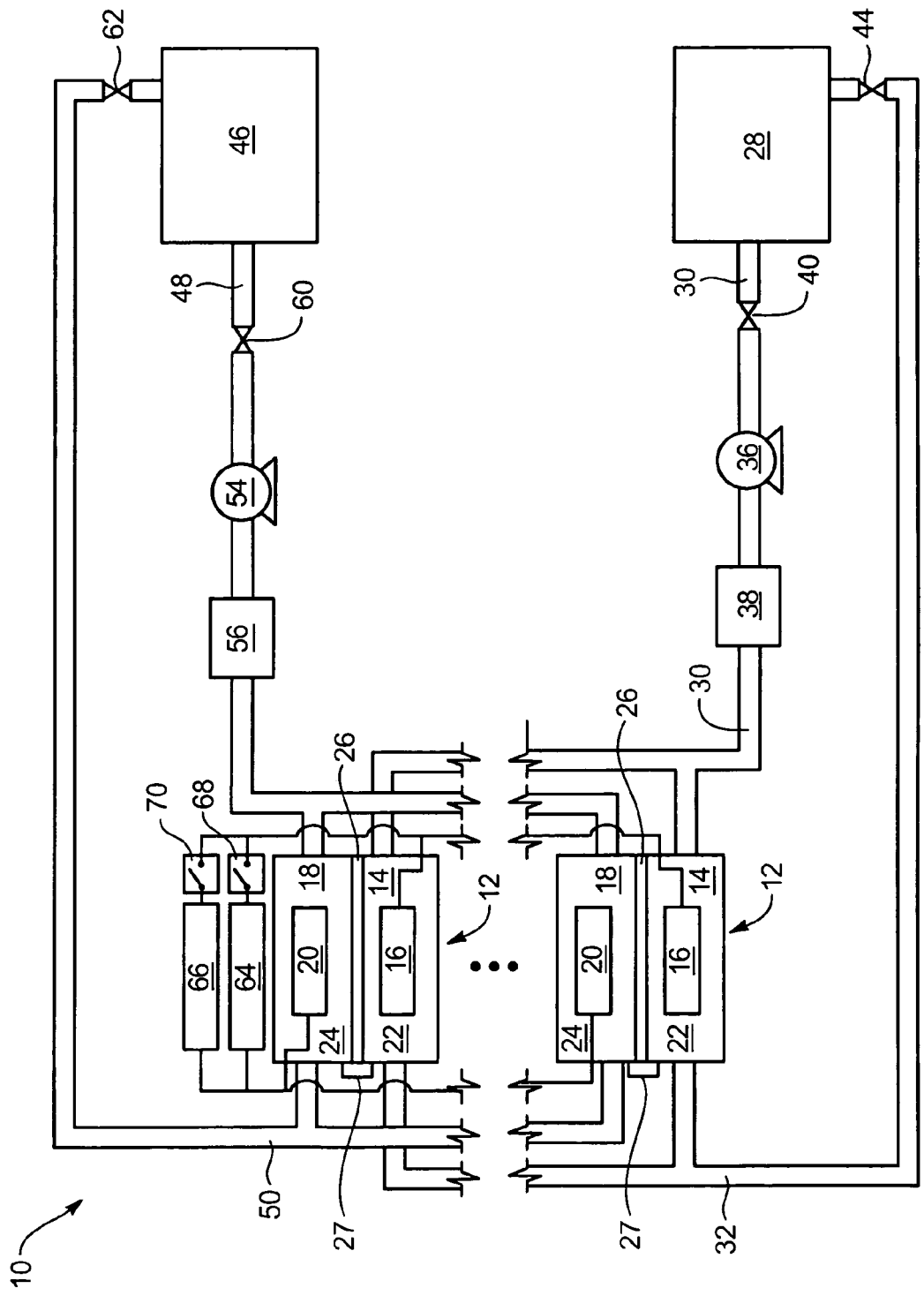
FIG. 1 is a block diagram of an embodiment of a vanadium redox battery energy storage system.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of presently preferred embodiments of the invention.

The phrases "connected to," "coupled to," and "in communication with" refer to any form of interaction between two or more entities, including mechanical, electrical, magnetic, fluid, and thermal interaction. Two components may be coupled to each other even through they are not in direct contact with each other. The term "abutting" refers to items that are in direct physical contact with each other, although the items may not necessarily be attached together.

New technological innovations and ever-increasing demands in electrical consumption have made solar and wind power plants a viable option. Energy storage systems, such as rechargeable batteries, are an essential requirement for remote power systems that are supplied by wind turbine generators or photovoltaic arrays. Energy storage systems are further needed to enable energy arbitrage for selling and buying power during off-peak conditions.

Vanadium redox energy storage systems (hereinafter "VRB-ESS") have received favorable attention because they promise to be inexpensive and possess many features that provide for long life, flexible design, high reliability, and low operation and maintenance costs. The vanadium redox energy storage system relies on a pumping flow system to pass the anolyte and catholyte solutions through the cells. In operating a vanadium redox energy storage system, flow rates, internal temperatures, pressure, charging and discharging times are all factors that influence power output.

A significant advantage of a VRB-ESS is that it only takes the same time period to recharge the VRB-ESS as it does to discharge it. Conventional lead acid batteries may take over five times their discharge rating to recharge. Thus, a four-hour rated lead acid battery may require 20 hours to recharge. In a 24-hour period, a four-hour rated VRB-ESS will be able to fully discharge and charge three times versus just one charge with a lead acid battery. In a 24-hour period, a lead acid battery may be able to only deliver power for four hours with any certainty. A lead acid battery risks power delivery if repeated faults occur on a grid after an initial discharge. With a VRB-ESS, power delivery is more available.

Repeated heavy discharges also reduce the life of the lead acid battery. A VRB-ESS does not degrade like a lead acid battery after multiple uses. Furthermore, determining the available state-of-charge (SOC) of a lead acid battery requires that it be discharged under load. A VRB-ESS is able to provide an absolute SOC of its available energy at all times as well as being more efficient than lead acid batteries.

Telecommunication equipment, such as microwave, radio, and television transmitters for cellular communication, am/fm broadcasts, television broadcasts, wireless internet access, and so forth are disposed on towers to enhance transmission coverage. Telecommunication equipment is relied upon to provide essential communications services and must include a constant power supply. A battery is often used to compensate for any interruption in an AC power source. Given the advantages of a VRB-ESS over lead acid batteries, it would be an advancement in the art to incorporate a VRB-ESS with a telecommunication system.

A vanadium redox battery energy storage system includes all sizes of vanadium redox batteries (VRB) in both absolute amp hour rating and energy storage duration in hours. The VRB-ESS includes storage reservoirs to hold vanadium electrolyte, an energy conversion mechanism defined as a cell, a piping and pumping flow system, and a power conversion system (PCS).

The VRB-ESS is in electrical communication with a control system that monitors and controls aspects of the performance of the components of the VRB-ESS. The control system may be implemented in any number of ways but, in one embodiment, includes a control program running on a suitable platform, such as programmable logic controller, microprocessor, or the like. The control system controls and manages the performance of the VRB-ESS in such a manner as to optimally meet the fundamental parameters of efficiency and safe operation. The control system further provides for self protection in the event of an external or internal fault or failure of a critical component, accurate controlled output as determined by dynamic load requirements or preset performance thresholds, and ambient conditions prevailing from time to time in each cycle.

A VRB-ESS optimally controls the power output, charging and discharging times, and efficiency of a VRB-ESS or any system that uses vanadium based electrolyte solution as the energy storage component of a battery. There are several key parameters which control the operation of a VRB. For any given concentration of electrolyte solution, the key parameters include temperature, volumetric flow rates, pressure within and across the cell stacks, and state of charge of the electrolyte and load as evidenced by the current drawn or supplied. The load may be seen as positive or negative. If negative, then the load is actually supplying power to the VRB. All of these parameters change in a dynamic manner continuously and vary with age.

In order to optimize the overall performance of the VRB, the present invention employs a control system that includes algorithms with control strategies. The control system allows the VRB-ESS to operate in an automatic mode to ensure that the highest possible efficiency is achieved as measured from the alternating current input to alternating current output on a round-trip basis. The control system adjusts according to the age of the VRB-ESS or as dynamic changes occur in any of the components. The control system provides optimized efficiency by controlling the charging and discharging, pump flow rates, and associated pressures within the VRB-ESS.

Referring to FIG. 1, a block diagram of a VRB-ESS 10 for use with the present invention is shown. A suitable energy storage system is required for remote power system applications that are supplied by either photovoltaic arrays or wind turbine generators. For such applications, low life-cycle cost and simplicity of operation are major requirements.

The VRB-ESS 10 includes one or more cells 12 that each include a negative compartment 14 with a negative electrode 16 and a positive compartment 18 with a positive electrode 20. Suitable electrodes include any number of components known in the art and may include electrodes manufactured in accordance with the teachings of U.S. Pat. No. 5,665,212, which is hereby incorporated by reference. The negative compartment 14 includes an anolyte solution 22 in electrical communication with the negative electrode 16. The anolyte solution 22 is an electrolyte containing specified redox ions which are in a reduced state and are to be oxidized during the discharge process of a cell 12, or are in an oxidized state and are to be reduced during the charging process of a cell 12, or which are a mixture of these latter reduced ions and ions to be reduced. By way of example, in a VRB-ESS 10 the charge-discharge redox reaction occurring at the negative electrode 16 in the anolyte solution 22 is represented by Equation 1:

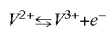

Eq. 1

The positive compartment 18 contains a catholyte solution 24 in electrical communication with the positive electrode 20. The catholyte solution 24 is an electrolyte containing specified redox ions which are in an oxidized state and are to be reduced during the discharge process of a cell 12, or are in a reduced state and are to be oxidized during the charging process of the cell 12, or which are a mixture of these oxidized ions and ions to be oxidized. By way of example, in a VRB-ESS 10 the charge-discharge redox reaction occurring at the positive electrode 20 in the catholyte solution 24 is represented by Equation 2:

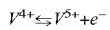

Eq. 2

The anolyte and catholyte solutions 22, 24 may be prepared in accordance with the teachings of U.S. Pat. Nos. 4,786,567, 6,143,443, 6,468,688, and 6,562,514, which are hereby incorporated by reference, or by other techniques well known in the art. The anolyte solution 22 refers to an electrolyte containing specified redox ions which are in a reduced state and are to be oxidized during the discharge process of a redox battery, or are in an oxidized state and are to be reduced during the charging process of a redox battery, or which are a mixture of these latter reduced ions and ions to be reduced. The catholyte solution 24 refers to an electrolyte containing specified redox ions which are in an oxidized state and are to be reduced during the discharge process of a redox battery, or are in a reduced state and are to be oxidized during the charging process of the redox battery, or which are a mixture of these oxidized ions and ions to be oxidized. Further, aqueous NaOH is not included within the scope of anolyte solution 22, and aqueous HCl is not included within the scope of a catholyte solution 24. In one embodiment, the anolyte solution 22 is 1M to 6M $H_2SO_4$ and includes a stabilizing agent in an amount typically in the range of from 0.1 to 20 wt %, and the catholyte solution 24 is 1M to 6M $H_2SO_4$.

Each cell 12 includes an ionically conducting separator 26 disposed between the positive and negative compartments 14, 18 and in contact with the anolyte and catholyte solutions 22, 24 to provide ionic communication therebetween. The separator 26 prevents the transport of water, vanadium, and sulfate ions. The separator 26 serves as a proton exchange membrane and may be embodied as a selemion, new selemion, flemion, or nafion membrane.

Each cell 12 may further include a SOC sensor 27 to measure a current SOC for the corresponding cells. The SOC sensors 27 are read and the SOCs aggregated to determine the SOC of the VRB-ESS 10. The SOC for the VRB-ESS 10 may be determined during charging or discharging.

Additional anolyte solution 22 is held in an anolyte reservoir 28 that is in fluid communication with the negative compartment 14 through an anolyte supply line 30 and an anolyte return line 32. The anolyte reservoir 28 may be embodied as a tank, bladder, or other container known in the art. In one embodiment, the anolyte reservoir 28 may be a plastic-sealed, double-walled tank. The anolyte supply line 30 may communicate with pump 36 and heat exchanger 38. The pump 36 enables fluid movement of the anolyte solution 22 through the anolyte reservoir 28, supply line 30, negative compartment 14, and return line 32. The pump 36 has a variable speed to allow variance in the generated flow rate. The heat exchanger 38 transfers generated heat from the anolyte solution 22 to a fluid or gas medium. The pump 36 and heat exchanger 38 may be selected from any number of known, suitable devices.

The supply line 30 may include one or more supply line valves 40 to control the volumetric flow of anolyte solution. The return line 32 may include one or more return line valves 44 that control the return volumetric flow.

Similarly, additional catholyte solution 24 is held in a catholyte reservoir 46 that is in fluid communication with the positive compartment 18 through a catholyte supply line 48 and a catholyte return line 50. The catholyte reservoir 46 may be a tank, such as a plastic-sealed, double-walled tank, a bladder, or other suitable device. Catholyte supply line 48 may communicate with pump 54 and heat exchanger 56. The pump 54 may be a variable speed pump 54 that enables flow of the catholyte solution 22 through the catholyte reservoir 46, supply line 48, positive compartment 18, and return line 50. Supply line 48 may also include supply line valve 60, and return line 50 may include return line valve 62.

The negative and positive electrodes 16, 20 are in electrical communication with a power source 64 and a load 66. A power source switch 68 is disposed in series between the power source 64 and each negative electrode 16. Likewise, a load switch 70 is disposed in series between the load 66 and each negative electrode 16. One of skill in the art will appreciate that alternative circuit layouts are possible, and the embodiment of FIG. 1 is provided for illustrative purposes only as this disclosure may apply to any combination of catholyte-anolyte cells forming a VRB-ESS.

In charging, the power source switch 68 is closed, and the load switch is opened. Pumps 36 pump the anolyte solution 22 through the negative compartment 14 and anolyte reservoir 28 via anolyte supply and return lines 30, 32. Simultaneously, pumps 54 pump the catholyte solution 24 through the positive compartment 18 and catholyte reservoir 46 via catholyte supply and return lines 48, 50. Each cell 12 is charged by delivering electrical energy from the power source 64 to negative and positive electrodes 16, 20. The electrical energy derives divalent vanadium ions in the anolyte solution 22 and quinvalent vanadium ions in the catholyte solution 24.

Electricity is drawn from each cell 12 by opening load switch 70 and closing power source switch 68. This causes load 66, which is in electrical communication with negative and positive electrodes 16, 20 to withdraw electrical energy.

A number of control parameters influence the efficiency of the system 10. A key control parameter is the temperature of the anolyte and catholyte solutions 22, 24. The temperature is influenced by ambient conditions and load requirements. Another control parameter is the pressure of the solutions 22, 24 which is influenced by flow rates, SOC, temperature, and plant design. A further control parameter is the flow rate, which is controlled through variable speed drives. Other control parameters include charging current and duration of constant current periods, as determined by SOC.

Another control parameter is hydrogen evolution. The hydrogen evolution is minimized in the control strategy and is influenced by temperature, SOC, load and rates of charge and discharge, which are ramp rates.

Another control parameter is the remixing of concentrations of the anolyte and catholyte solutions 22, 24 with respect to volumes. Pressure differentials develop over time as reservoirs 28, 46 have different electrolyte levels due to crossover. Concentrations also vary, and system optimization must factor the remixing parameter.

Recharge and discharge periods are additional control parameters. The rate of charge and discharge impact the evolution of hydrogen. In addition, during discharge, heat is developed, and the temperature of the anolyte and catholyte solutions 22, 24 is raised. Viscosity is thus affected, and pump flow rates need to be adjusted accordingly. The optimal time for charge and discharge is selected within the maximum rates that the system can handle as well as within the load requirements, i.e., time available in a day.

Figure 2:
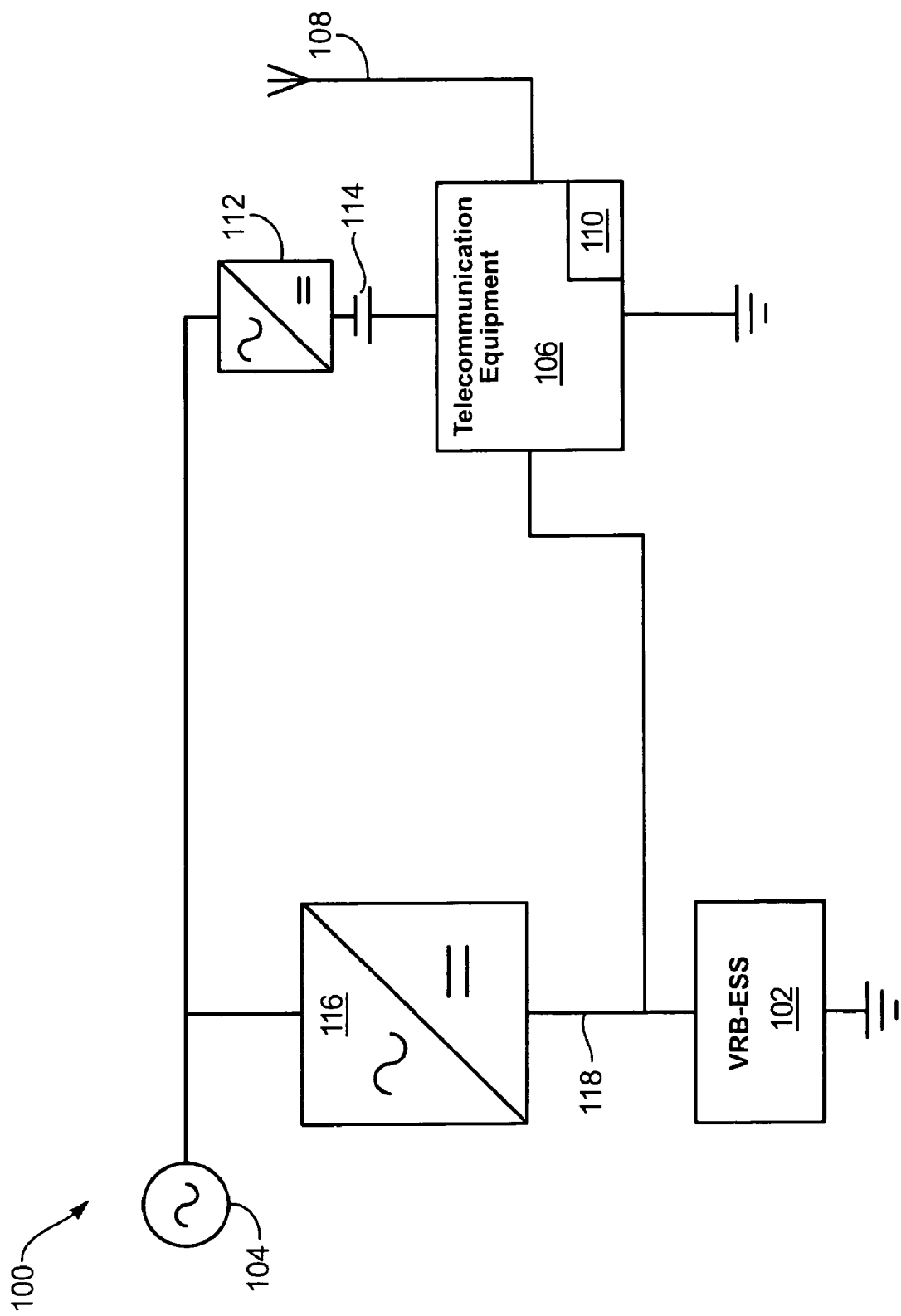
FIG. 2 is a block diagram illustrating an embodiment of a telecommunication system.

Referring to FIG. 2, a block diagram of a telecommunication system 100 is shown that includes a VRB-ESS 102, which may be embodied similarly to that shown in FIG. 1. The VRB-ESS 102 is capable of providing multiple DC voltages even while being charged. For example, the VRB-ESS 102 can provide a −24V and −48V DC supply without a need for additional power electronics. The VRB-ESS 102 can also be charged and discharged simultaneously unlike other batteries.

The system 100 is in electrical communication with an AC source 104. The AC source 104 may originate from a power grid, or be embodied as one or more wind turbines, one or more solar panels, or other alternative sources. Thus, the system 100 may operate in a remote area and be isolated from a power grid with the appropriate AC source 104. The telecommunication system 100 includes telecommunication equipment 106 that includes any number of transmitter, receiver, or transceiver devices to provide broadcasts in the electromagnetic spectrum. For cellular, radio, and television communication purposes, the band of the electromagnetic spectrum is from approximately 1 MHz to approximately 40 GHz. Telecommunication equipment 106 may include signal conversion, noise reduction, and amplification devices to improve and boost the signal gain as needed.

The telecommunication equipment 106 is in electrical communication with one or more antennas 108 to send or receive electromagnetic waves. The telecommunication equipment 106 may include an internal battery backup 110 to provide a short-term power supply in the event of power interruption. The internal battery backup 110 may provide a few seconds of power. In many instances, that is all that is required to avoid broadcast interruption. Thus, the battery backup 110 provides a temporary uninterruptible power supply (UPS) functionality to have the telecommunication equipment 106 remain operational during power interruption.

A rectifier 112 is in electrical communication with the AC power source 104 to receive and convert the AC power to DC power for use by the telecommunication equipment 106. The system 100 may further include a rechargeable power cell 114 in electrical communication with the rectifier 112 and the telecommunication equipment 106. The power cell 114 provides short-term power during a power interruption and thereby provides additional UPS functionality.

The system 100 further includes a VRB-ESS charger/rectifier 116 to convert AC power to DC power and to charge the VRB-ESS 102. The VRB-ESS charger/rectifier 116 is in electrical communication with the VRB-ESS 102 through a DC voltage bus 118. During uninterrupted operations, the AC power charges the VRB-ESS 102 and powers the pumps 36, 54.

The VRB-ESS 102 is sized to support the telecommunication equipment 106 for a predetermined amount of time. As the power demands for the telecommunication equipment 106 are altered, the VRB-ESS 102 may be replaced with an alternatively sized device. By way of example, a VRB-ESS 102 may be sized at 112 Ah for four hours of operation to provide 448 Ah. This provides 20 kw hours or 5 kw for four hours or 112 amps. The VRB-ESS charger/rectifier 116 is sized accordingly, but normally at a 10 percent higher rating than the VRB-ESS 102.

Due to its recharge speed, the VRB-ESS 102 may be oversized to allow for additional power storage, which allows the VRB-ESS 102 to be used proactively to manage load demands through aggregated dispatch. This does not reduce the availability or reliability and can be used to lower energy bills as a dispersed energy resource. Conventional lead acid batteries cannot achieve this without lengthening the recharge times and thereby reduce availability and reliability.

The VRB-ESS 102 is able to provide its absolute SOC at any time which allows for system planning and determining when the telecommunication equipment 106 will cease operation. During a long-term power interruption, an operator may confirm the SOC and be aware of the need to bring diesel generators on-line to power the telecommunication equipment and recharge the VRB-ESS 102.

Figure 3:
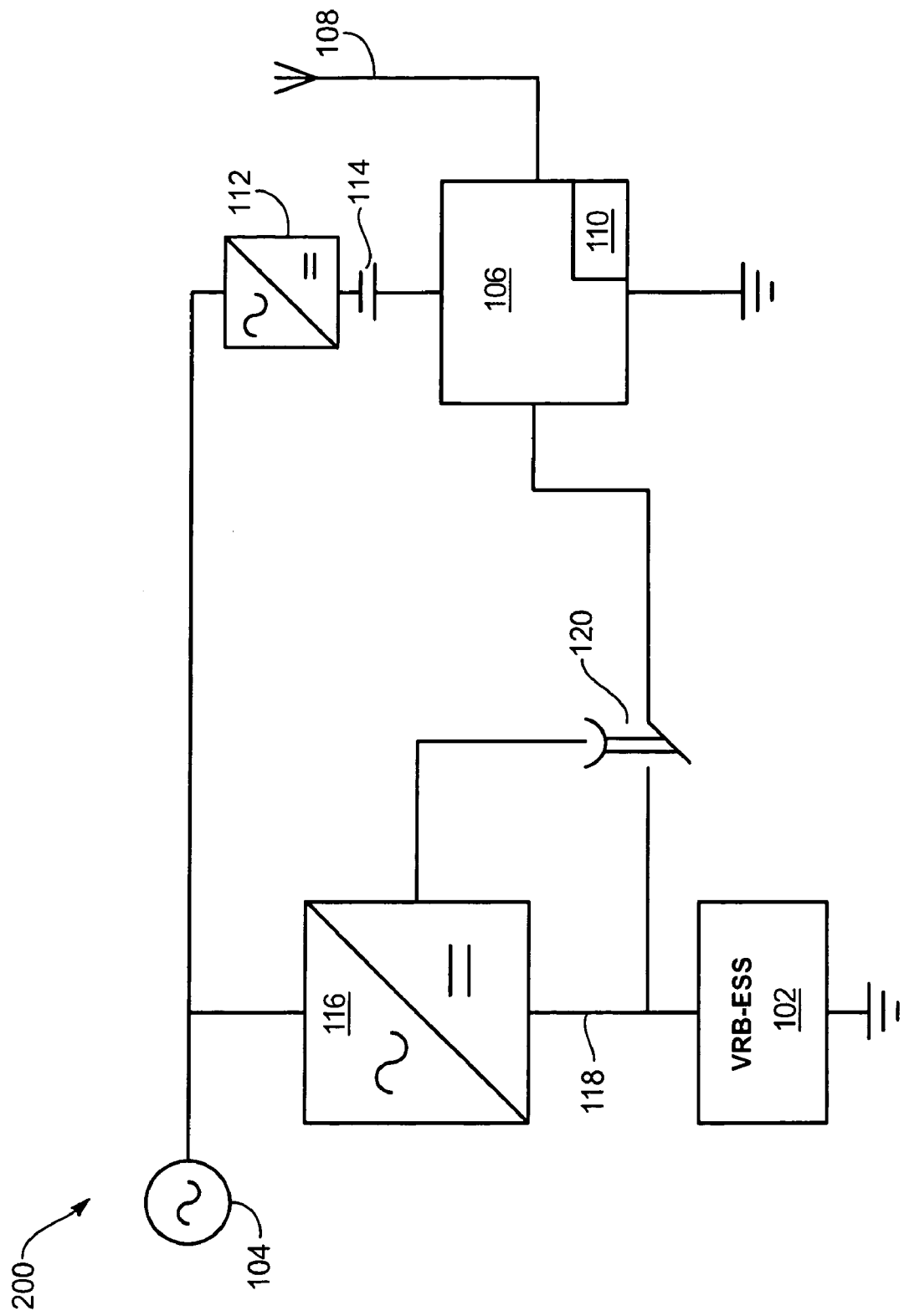
FIG. 3 is a block diagram illustrating an embodiment of a telecommunication system.

Referring to FIG. 3, an alternative embodiment of a telecommunication system 200 is shown. The system 200 includes a switch 120 that is in electrical communication with the VRB-ESS charger/rectifier 116, VRB-ESS 102, and the telecommunication equipment 106 as shown. The switch 120 is timer controlled by the availability of AC power and may remain open to prevent transmission of DC power from the VRB-ESS 102.

The VRB-ESS charger/rectifier 116 senses when the AC power has been interrupted or resumed. When AC power is interrupted, a control signal is transmitted from the VRB-ESS charger/rectifier 116 to the switch 120. Upon receiving the control signal, the switch 120 waits for a predetermined amount of time before closing and enabling transmission of DC power from the VRB-ESS 102. This prevents use of the VRB-ESS 102 for false interruptions, which may occur during brown-out and black-out situations. During this deadband period of time, the telecommunication equipment 106 may rely on power from the internal battery 110 and the power cell 114. When AC power is restored, the VRB-ESS charger/rectifier 116 transmits a control signal to the switch 120, and the switch 120 opens. AC power is simultaneously transmitted once again to the telecommunication equipment 106 and to the VRB-ESS 102 for recharging.

Figure 4:
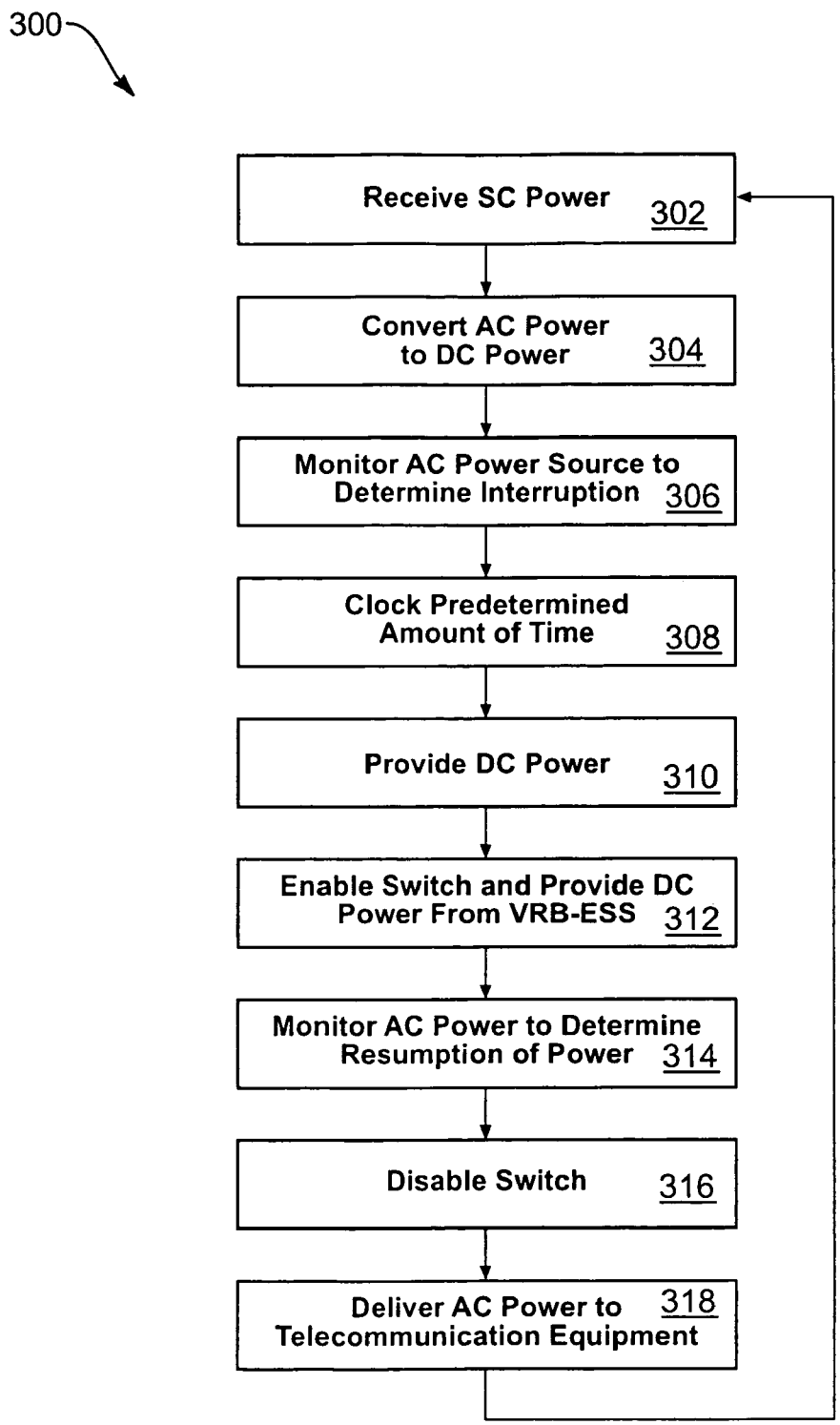
FIG. 4 is a flow diagram illustrating a methodology of the present invention.

Referring to FIG. 4, a flow diagram 300 for providing power to telecommunication equipment is shown. The flow diagram 300 relates to the system 200. Telecommunication equipment receives 302 power from an AC source. The power is converted 304 from AC to DC. The AC source is monitored 306 to determine if there is an interruption. Upon interruption of AC power, a predetermined amount of time is clocked 308 to determine if AC power is resumed. Simultaneously, DC power is provided 310 to the telecommunication equipment from an internal battery, power cell, and/or some other power source. Upon reaching the predetermined amount of time, a switch is enabled 312 to deliver DC power from a VRB-ESS to the telecommunication equipment.

AC power is continuously monitored 314 to determine when AC power resumes. Upon AC power resumption, the switch is disabled 316, and DC power from the VRB-ESS ceases transmission to the telecommunication equipment. AC power is delivered 318 to the VRB-ESS to enable recharging. The process continues with monitoring 306 the AC power source once again.

During an AC power interruption, the VRB-ESS may provide DC power until AC power resumes or until fuel cell charges are depleted. An operator may monitor the SOC sensors 27 and determine the SOC for the VRB-ESS. The current SOC indicates the time remaining for the telecommunication equipment before the VRB-ESS charge is depleted. During the remaining time, fossil fuel generators or additional batteries may be employed to power the telecommunication equipment if resumption in AC power does not appear imminent.

If a system 100 does not include a switch 120, then steps 308, 312, and 316 are not needed. The switch is effectively "on" at all times, and an interruption of AC power initiates delivery of DC power from an internal battery 110, power cell 114, and from the VRB-ESS 102.

A telecommunication system disclosed herein incorporates a VRB-ESS with a highly efficient recharge rate and increased availability. The system detects a power interruption and employs a VRB-ESS in a timely manner to prevent interruption in telecommunication operation. The VRB-ESS is able to relay the present SOC at any time to improve system planning. The VRB-ESS eliminates the need for a large internal battery in the telecommunication equipment 106. A VRB-ESS is more durable than lead acid batteries with a longer life, lower operating costs, reduced losses, and is very efficient. A VRB-ESS has remote monitoring capability to determine its SOC, and the SOC tells you whether the battery is functioning or not.

It will be obvious to those having skill in the art that many changes may be made to the details of the above-described embodiments without departing from the underlying principles of the invention. The scope of the present invention should, therefore, be determined only by the following claims.

The invention claimed is:

1. A telecommunication system to generate electromagnetic transmissions and operating on power initiated from an AC source, comprising:
   telecommunication equipment including an antenna;
   a rectifier in electrical communication with the AC source and the telecommunication equipment, the rectifier to convert AC power to DC power;
   a VRB-ESS charger/rectifier in electrical communication with the AC source, the VRB-ESS charger/rectifier converting AC power to DC power, the VRB-ESS charger/rectifier to monitor received AC power to determine an AC power interruption;
   a VRB-ESS in electrical communication with the VRB-ESS charger/rectifier to receive DC power to thereby charge the VRB-ESS, the VRB-ESS further in electrical communication with the telecommunication equipment to provide DC power transmission to the telecommunication equipment; and
   a timer switch in electrical communication with the VRB-ESS charger/rectifier and the VRB-ESS to control DC power transmission from the VRB-ESS to the telecommunication equipment, the timer switch to receive a control signal from the VRB-ESS charger/rectifier indicative of an AC power interruption, the timer switch to wait a predetermined time period before enabling DC power transmission to the telecommunication equipment.

2. The telecommunication system of claim 1, wherein the VRB-ESS charger/rectifier is further to monitor the AC power to determine AC power resumption.

3. The telecommunication system of claim 2, wherein the VRB-ESS is further to transmit a control signal indicative of AC power resumption to the timer switch, and wherein the timer switch, in response to the control signal, disables DC power transmission to the telecommunication equipment.

4. The telecommunication system of claim 1, wherein the telecommunication equipment includes an internal battery to provide DC power upon an AC power interruption.

5. The telecommunication system of claim 1, further comprising a power cell in electrical communication with the rectifier and the telecommunication equipment to provide DC power to the telecommunication equipment upon an AC power interruption.

6. The telecommunication system of claim 1, wherein the VRB-ESS includes a SOC sensor to measure a present SOC.

7. A method for providing power to telecommunication equipment for generating electromagnetic transmissions, comprising:
   converting AC power from an AC source into DC power for operating the telecommunication equipment;
   placing the telecommunication equipment in electrical communication with DC power;
   converting AC power from the AC source into DC power for charging the VRB-ESS;
   placing a VRB-ESS in electrical communication with DC power;
   placing the VRB-ESS in electrical communication with the telecommunication equipment;
   the VRB-ESS transmitting DC power to the telecommunication equipment upon AC power interruption;
   monitoring received AC power to determine an AC power interruption;
   transmitting a control signal indicative of an AC power interruption to a timer switch, the timer switch to control DC power transmission from the VRB-ESS to the telecommunication equipment; and the timer switch waiting a predetermined time period after receiving the control signal before enabling DC power transmission to the telecommunication equipment.

8. The method of claim 7, further comprising monitoring AC power to determine AC power resumption.

9. The method of claim 8, further comprising:

transmitting a control signal indicative of AC power resumption to the timer switch; and the timer switch, in response to the control signal, disabling DC power transmission from the VRB-ESS to the telecommunication equipment.

10. The method of claim 7, further comprising an internal battery providing DC power to the telecommunication equipment upon an AC power interruption.

11. The method of claim 7, further comprising a power cell providing DC power to the telecommunication equipment upon an AC power interruption.

12. The method of claim 7, further comprising monitoring the SOC of the VRB-ESS and determining a remaining operating time for the telecommunication equipment based on the SOC.

13. A method for providing power to telecommunication equipment for generating electromagnetic transmissions, comprising:

a rectifier converting AC power from an AC source into DC power for operating the telecommunication equipment;

placing the telecommunication equipment in electrical communication with the DC power;

a VRB-ESS charger/rectifier converting AC power from the AC source into DC power;

placing a VRB-ESS in electrical communication with the DC power;

placing the VRB-ESS in electrical communication with the telecommunication equipment;

the VRB-ESS transmitting DC power to the telecommunication equipment upon AC power interruption;

the VRB-ESS charger/rectifier monitoring received AC power to determine an AC power interruption;

the VRB-ESS charger/rectifier transmitting a control signal indicative of an AC power interruption to a timer switch, the timer switch to control DC power transmission from the VRB-ESS to the telecommunication equipment; and the timer switch waiting a predetermined time period after receiving the control signal before enabling DC power transmission to the telecommunication equipment.

14. The method of claim 13, further comprising the VRB-ESS charger/rectifier monitoring AC power to determine AC power resumption.

15. The method of claim 14, further comprising:

the VRB-ESS charger/rectifier transmitting a control signal indicative of AC power resumption to the timer switch; and the timer switch, in response to the control signal, disabling DC power transmission from the VRB-ESS to the telecommunication equipment.

16. The method of claim 13, further comprising an internal battery providing DC power to the telecommunication equipment upon an AC power interruption.

17. The method of claim 13, further comprising a power cell providing DC power to the telecommunication equipment upon an AC power interruption.

18. The method of claim 13, further comprising:

an SOC sensor monitoring the SOC of the VRB-ESS; and determining a remaining operating time for the telecommunication equipment based on the SOC.

* * * * *